United States Patent [19]

Walker

[11] 4,177,581

[45] Dec. 11, 1979

[54] DEVICE FOR TEACHING CONCEPTS OF NUMBERS AND MATHEMATICAL PRINCIPLES

[76] Inventor: Hazel Walker, The Retreat, 107, Heslington Rd., York, England

[21] Appl. No.: 822,662

[22] Filed: Aug. 8, 1977

[51] Int. Cl.² .......................... G09B 19/02; G09B 1/10
[52] U.S. Cl. .................................................. 35/31 D
[58] Field of Search ............ 35/30, 31 R, 31 D, 31 F, 35/31 G, 70, 72, 73

[56] References Cited

U.S. PATENT DOCUMENTS

| | | | |
|---|---|---|---|
| 1,294,126 | 2/1919 | Linay | 35/70 |
| 3,094,792 | 6/1963 | Morgan et al. | 35/31 R |
| 3,229,388 | 1/1966 | Smith | 35/31 G |
| 3,410,002 | 11/1968 | Mulholland et al. | 35/70 X |
| 3,414,986 | 12/1968 | Stassen | 35/31 D |
| 3,452,454 | 7/1969 | Easton et al. | 35/31 R |
| 3,935,649 | 2/1976 | Harte | 35/31 D |

*Primary Examiner*—William H. Grieb
*Attorney, Agent, or Firm*—Norris & Bateman

[57] ABSTRACT

The invention provides a device for teaching concepts of numbers and mathematical principles comprising a base component having a surface divided into a hundred identical unit squares in ten by ten format, and two series of number elements for use with the base component. Each number element of the first series is dimensioned so that it corresponds exactly in size and shape with a whole number of the unit squares on the base component and displays unit squares corresponding to those unit squares it covers on the base component when it is placed on the base component. Each number element of the first series is marked with the number which it represents in terms of the unit squares. Each number element of the second series has a length corresponding to ten unit squares and a width corresponding to a plurality of unit squares.

The displaying function of the first series can be achieved either by the number elements being sufficiently transparent to allow unit squares on the base component to be visible through the number elements, or alternatively, if the number elements are themselves opaque, then they can be marked with unit squares identical in size to those on the base component.

The invention further provides boxes wherein the number elements can be stored in a manner expressive of basic arithmetical functions.

8 Claims, 8 Drawing Figures

DEVICE FOR TEACHING CONCEPTS OF NUMBERS AND MATHEMATICAL PRINCIPLES

GENERAL BACKGROUND OF THE INVENTION

The invention relates to a device for teaching concepts of numbers and mathematical principles, and is thus particularly concerned with educational procedures. Known forms of simply constructed teaching apparatus such as the abacus suffer from the disadvantage that they can only be used for a limited range of concepts and mathematical procedures. The present invention provides very simple apparatus which is capable of use in a wide range of numeracy teaching procedures.

SUMMARY OF THE INVENTION

A device in accordance with the invention for teaching concepts of numbers and mathematical principles comprises a base component having a surface divided into a hundred identical unit squares in ten by ten format, and a first series of number elements for use with said base component, each number element of said first series being dimensioned so that it corresponds exactly in size and shape with a whole number of said unit squares on said base component, each number element of said first series displaying unit squares corresponding to those unit squares it covers on said base component when said number element is placed on said base component, each said number element being also marked with the number which it represents in terms of said unit squares, and a second series of number elements comprising at least one element having a length corresponding to the length of ten unit squares on said base component, and a width corresponding to a plurality of squares on said base component.

In one method of carrying out the invention, at least some of said number elements are sufficiently transparent to allow said unit squares on said base component to be visible through said number elements when said number elements are placed on said base component. In an alternative method of carrying out the invention, wherein said number elements may have an opaque nature, at least some of said number elements are themselves marked with unit squares identical in size to those of said base component.

At least some of said number elements may be coloured, in which case, it is preferred that said number elements of one size are of one colour, but that the number elements of each size are of a different colour to next adjacent number elements in any series of number elements. According to another preferred feature, at least some of said number elements have dark edges whereby individual number elements can be distinguished when two or more such elements are placed on said base component in abutting relationship. At least some of said number elements may have a physical distinguishing feature such as a peg or a hole, expressive of the concept of the number of that element.

According to another preferred feature of the invention, said base component and each of said number elements have means for holding said number elements on said base component. For example, said base component may have a peg upstanding from each unit square, and each of said number elements may have a corresponding hole formed in each of its unit squares, whereby said pegs can be received in said holes, to locate said number elements on said base components. Alternatively magnetic location means may be employed.

According to another preferred feature of the invention, the device comprises a quota of said number elements associated with a single base unit, said quota comprising ten of each of said number elements 1 to 10, five of said number elements 20, three of said number elements 30, two of said number elements 40 and 50, and one of each of said number elements 60, 70, 80, 90, 100. According to yet another preferred feature of the invention, a box is provided having a length such that it is adapted to receive a number element 10 squares long, and further adapted to receive number elements in pairs which together total 10 unit squares long, i.e. 9 and 1, 8 and 2, 7 and 3, 6 and 4, 5 and 5. Further, the invention may comprise another box having spaces to receive number elements of denominations 20, 30, 40, 50, 60, 70, 80, 90 and 100 so that these number elements are displayed in ratios of each other.

SPECIFIC EMBODIMENT

The invention will be better understood, from the following description of a specific embodiment of the invention, together with numerous ways in which the invention may be used, which is given here by way of example only, with reference to accompanying drawings, in which.

Figure 1:
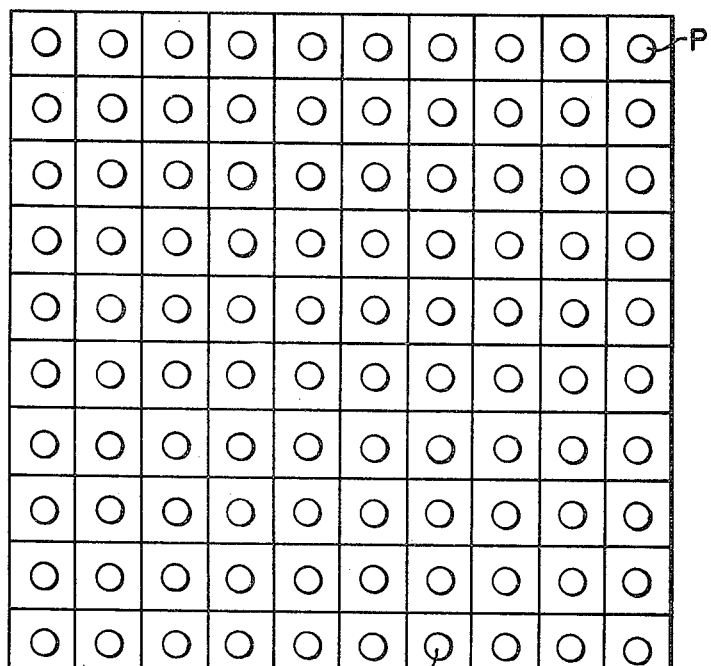
FIG. 1 is a top plan view of a base component.
Figure 2:
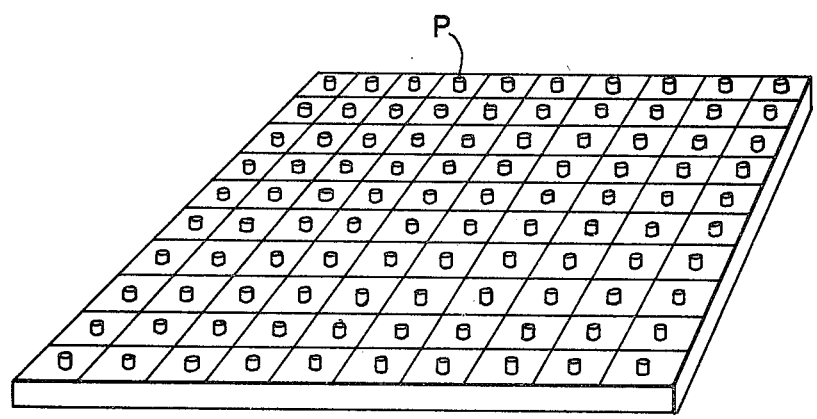
FIG. 2 is a perspective view of the base component of FIG. 1.
Figure 3:
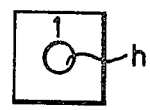
FIGS. 3 to 8 show respectively a series of number elements representing units 1, 2, 3, 10, 20, and 30.

FIGS. 1 and 2 show a base component, which takes the form of a board, which is lined out so that it provides one hundred identical squares in a ten by ten format. A short round peg p projects upwardly from the center of each of the squares. The apparatus also includes a quota of number elements such as those illustrated in FIGS. 3 to 8. Each of the number elements is made of transparent plastics material, and is of a size and shape such that it will cover a precise whole number of the squares marked on the base component. For example, the element shown in FIG. 3, is a single unit square, and consequently is dimensioned so that it corresponds precisely with one of the unit squares on the base component. This element illustrated in FIG. 3 is formed with a hole h arranged centrally of the element, and adapted to be received on one of the pegs p of the base component, so that the element can be located on the base component over one of the squares marked thereon. Furthermore, the single hole h in the element shown in FIG. 3 itself acts as a physical distinguishing feature expressive of the concept of the number of that unit. It will be noted however, that the numeral "1" is also marked on the top surface of the element.

Figure 4:
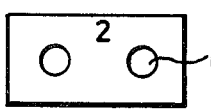
Figure 5:
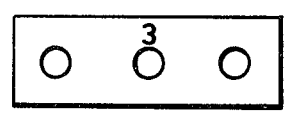
Figure 6:
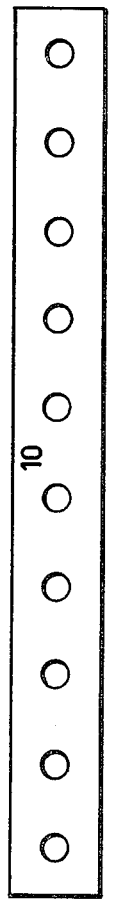
Figure 7:
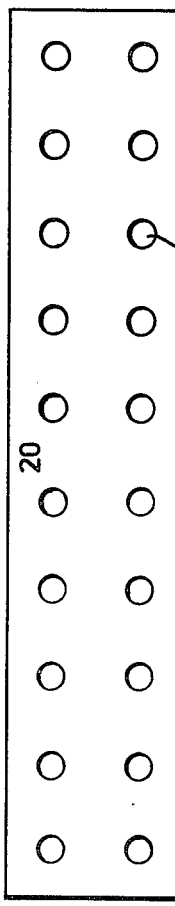
Figure 8:
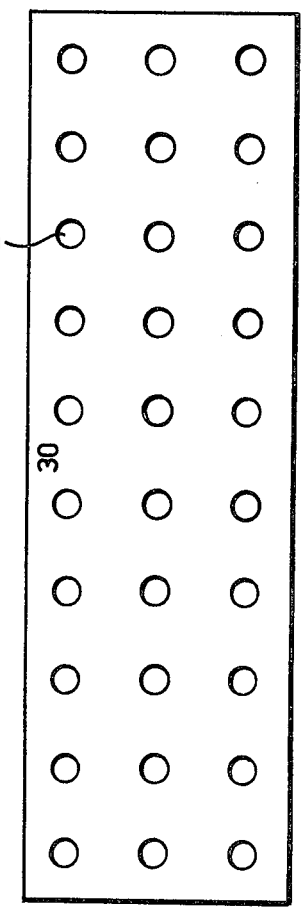

The element which is illustrated in FIG. 4, is of such dimensions that it is adapted to fit over two of the squares on the base component, and for this purpose it has two holes h whereby it can be accurately located over two of the squares on the base component, and its top surface also bears the inscription "2". Similarly, the element which is shown in FIG. 5 is adapted to fit over three unit squares, and the element which is shown in FIG. 6 is adapted to fit over ten unit squares. All of the elements shown in FIGS. 3 to 6 are adapted to fit over unit squares in a single row of the base component. The element which is illustrated in FIG. 7, is adapted to cover twenty unit squares of the base component, in a ten by two format, and the element which is illustrated in FIG. 8 is adapted to cover thirty unit squares in a ten by three format. Each of the elements has dark edges, so that if two such elements are placed on the base component in abutting relationship, they can be readily distinguished one from the other.

In the complete apparatus, the number unit elements are provided in denominations 1, 2, 3, 4, 5, 6, 7, 8, 9, 10, 20, 30, 40, 50, 60, 70, 80, 90, 100. The full quota comprises ten of each of the elements 1 to 10 inclusive, five of each of the elements 20, three of each of the elements 30, two of each of the elements 40, 50, and one of each of the elements 60, 70, 80, 90, 100.

A first box (not shown) for the elements of denominations 1 to 10, contains these elements stacked on their edges. The internal depth of the box matches the element width. The internal length of the box equals that of the element 10 and thus allows the elements to be stored in the box in a visual display, wherein two elements together equal the length of the 10 element, i.e. 9 and 1, 8 and 2, 7 and 3, 6 and 4, 5 and 5. The internal width of the box equals that of the total thickness of the elements in this arrangement.

A second box (also not shown) is provided, for containing the elements of denominations 20 to 100, lying flat. The internal dimensions of this box correspond to the area of the element 100, and the total thickness of the elements.

The principle behind the use of the invention is adapted from photographic negative and positive images involving montage and superimposition techniques, thereby creating a "projection" onto "sensitised paper" of numerical concepts, relationships between these, and the underlying principles of mathematics.

USE OF THE INVENTION

In the following specific description of certain uses of the invention, the number unit elements exemplified in FIGS. 3 to 8 of the drawings, are referred to as templates.

(1) All mathematical understanding depends on an initial awareness of there being numbers. Such awareness is brought about by use of the templates 1 to 10, inclusive, in that:
(a) several examples of each have a repetetive impression.
(b) differentiation between these is intensified by several examples.
(c) the dimensions of the box containing these templates will require differentiation.

(2) What is meant by the terms 1, 2, 3, 4, 5, 6, 7, 8, 9, 10, is instilled by constant psychological association of respective figure markings, lengths, holes, —and pegs and squares covered when templates attached to the base.

(3) Thus, too, numbers are shown as having a descriptive sense.

(4) While recognition of the comparative gradations—this a development of 1 (b), reveals numbers as being abstracts with positions on a scale.

(5) Is stimulated a reaction which is counting—i.e. as hole, hole, or square, square, square, square, until this replaced by terms learned and according to order.

(6) How figure markings are alternatively over a hole or between holes conveys a distinction i.e. odd and even, between numbers.

(7) Understanding of a scale re (4), is also involved as the psychological association of (2) extends to number concepts as, for example, what is added to 2 to make 6, or what remains when 3 is taken away from 8 as the templates are compared alongside—both on and off the base.

(8) Addition and subtraction are meaningful in actually being done.

(9) This, too, as subtraction is the reverse to addition.

(10) Complements of 10, as these apply to either process are absorbed. Most especially from the box containing the templates, but to some extent from these comparisions.

(11) It is realised that subtraction must be from a higher number.

(12) How there is a continuation of numbers is shown by addition comparisions off the base, when such examples as 8+7 extend beyond the 10 template alongside and thus need another piece as complement.

(13) The balancing aspect of both comparisions (7) and (12) conditions the important fundamental idea of the equation.

(14) From a comprehensive range of examples as (12), is gained concepts of numbers, which, relevant to (4), assume positions as 10 and 1, 10 and 2, and so on to 10 and 10. Such concepts being consolidated when these examples are practised on the base.

(15) Only what the limited scope of the 10 template in (12), also involves here the definite restriction of the row format of ten unit squares. Which restriction constitutes the basis of the number scale.

(16) Thus, it is necessary to substitute templates so is made a complete row and part of a row—intrinsically the method of adding units to form tens.

(17) Is appreciated that, although a continuation (12), numbers are to be placed in orderly arrangement.

(18) Can be understood that the nought of the 10 is replaced, whereby 10 and 1 etc. (14) are expressed as 11-19 inclusive, which link up to the 10 and 10, corresponding, on the base, to the template marked 20.

(19) Are being learned (12-18), The totals which exceed 10 of combinations of numbers e.g. 7+5, 4+8, 9+6. These also relevant to subtraction.

(20) Corresponding examples of this reflect (11). Illustrate the same dependence on there being a 10 as in generally subtracting a higher units figure.

(21) Is seen that this can be taken from the 10 template and what remains joins to the other units.

(22) That examples suc as 20-8 need a 10 which is part of the 20.

(23) The 20-100 templates establish a framework of there being an ascendancy pattern of numbers.

(24) This begun (14-18) is continued on similar lines to show 21-29. Since 20 and 10 then correspond to 30, the same procedure gives 31-39, the 30 and 10 are replaced with 40, and so on.

(25) Which further impresses the being understood, from (12) onwards, distinction between tens and units.

(26) Intrinsic in which is the very important idea of place value.

(27) This emphasised by the templates 20-90, which are the same figures as those of units, but proportionately greater.

(28) Concepts of such being instilled as were those of units.

(29) Together with the concept of nought.

(30) And how this keeps figures in correct place.

(31) Visually impressed all the more in that this identifies with the base, 100 follows on the line of (27) with a correlating value to 10, and extends (25, 26) so 100; 10; 1.

(32) Is provided (18, 23-31), the groundwork for understanding that the 1 of 100 begins another set of numbers i.e. 200 etc. to 1000, and then is a similar continuation.

(33) The illustrating by the 20-100 templates and (24) that tens are added to tens, also serves re (26, 32) the case of hundreds, etc.

(34) From how units add up into tens (16, 24), then tens into hundreds (24), can be appreciated the basic pattern.

(35) Thus, too, the carrying figure.

(36) Building up the number scale as (24) combines with how (22) is of fundamental application to 30, 40, etc. and the method of (21) to facilitate, re (26, 31, 32), other instances of substraction where a higher figure necessitates breaking into the next place.

(37) The templates may be used to represent numbers in such examples as 45+22+71 or 136−88, until proficiency acquired.

(38) The 10's, 9's, 8's, etc. are recognisable as the same type.

(39) Intrinsic in sorting these together, is the idea of like groups.

(40) Placing the 10 templates on those of 20-100 makes a statement of a number added to itself.

(41) Register 2 lots of 10, 3 lots of 10, 4 lots of 10, etc.

(42) The procedure of (40) initiates a concept of divisibility.

(43) To which the factor becomes of meaning in that the 2 templates can be placed transversely across to exactly fit the 20, the 3 templates over the 30 and so on.

(44) This, also in (40), being basically the principle of division.

(45) There now 10 lots of 2, 10 lots of 3, 10 lots of 4, etc.

(46) With the same totals as (41). Showing how the order of multiplied numbers makes no difference.

(47) Both the formations 10+10, 10+10+10, etc. in (41) and 2+2+2+2+2+2+2+2+2+2, likewise 3, 4, 5, etc. in (45), visually impress the concept of multiplication.

(48) Can be understood the abbreviated terms e.g. 3×10 or 10×7.

(49) Is instilled, especially re (27), that to multiply by 10, a nought is added to the number.

(50) The comprehensive range of (41), suggests in contrast to the isolated instances of (45), that these could be given similar pattern.

(51) Thus, the idea of totalling like groups becomes of practical application.

(52) With the 9 templates as (40), 2×9 is 2×10 less 2, 3×9 is 3×10 less 3, and so on.

(53) Similarly, 2×8 is 2×10 less 4, 3×8 is 3×10 less 6, and etc.

(54) What must be taken away being the multiplication of 2's.

(55) Such assessment, facilitated by (41, 45, 46), of 2×2, 2×3 or 3×2, etc. develops the ideas of divisibility and factorisation (42, 43).

(56) This applicable, too, in how the 7's and 6's have respective complements of 3's and 4's.

(57) And the 5's lend themselves to rearrangement in pairs.

(58) The totals shown alternatively 5 or 0.

(59) Can be realised these will serve for the multiplication of 4's and also, more conveniently than re (56) for 6's, 7's.

(60) From the variety of examples (52-57), a product assumes identity as two numbers multiplied together.

(61) Other ways of practising multiplication both stimulate mathematical approach in general and repetitively aid learning of totals. These:

(62) By using tens as a measure alongside templates placed in a line.

(63) And, according to the row format of the base. In the case of 6's, 7's, 8's, 9's, taking from one template what is seen as needed to make others into tens e.g. 8+8+8 becomes 10+10+4=24.

(64) Which also of bearing on how the 3's fit as 3, the 4's as 2 to a row.

(65) Otherwise, the 2's and 5's in continuation.

(66) Certain examples being:
 (a) 2 * 2 * 2 * 2 * 2 (b) 3 * 3 * 3 (c) 4 * 4 and 2 * 2 * 2 * 2 * 2 3 * 3 * 3 4 * * 4
 (d) 5 * 5 again as in (57) which have the 5 * 5 characteristic that other numbers are formed, i.e. (a) 4, (b) 9, (c) 8, (d) 10. Illustrating there may be two sets of factors.

(67) By constant usage the totals of multiplied numbers become absorbed and (62, 63) can be done while working out examples where both tens and units.

(68) Of relevance (14, 18, 24), that these are dealt with individually. And most valuable (49).

(69) This too, as such principles extend to the multiplication of hundreds, thousands, etc. when similarly (67). Vitally involved are (26, 29-32).

(70) With an arrangement of one each of 1, 2, 3, 4, 5, 6, 7, 8, 9, 10, the other 1's, 2's, 3's, etc. are, in turn, placed as will fit on these.

(71) Thus, 1 as many times as the number.

(72) The 2 as one template on itself, then alternatively showing a remainder and being contained exactly i.e.

$$\boxed{\begin{matrix}2\\2\end{matrix}} \boxed{\begin{matrix}2*\\3\end{matrix}^r} \boxed{\begin{matrix}2*2\\4\end{matrix}} \boxed{\begin{matrix}2*2*\\5\end{matrix}^r} \boxed{\begin{matrix}2*2*2\\6\end{matrix}} \text{ and etc.}$$

(73) Of note being (6).

(74) That 2 will not go into 1 an example of what expressed 0.

(75) Similarly to (72), the 3, 4, etc. with varying remainders.

(76) The 2, 4, 6, 8, 10, in (72) and counterparts of (75) are recognisable as products (60).

(77) Arrived at in reverse to multiplication.

(78) Such method being division.

(79) This already (72, 75), applied to both the 10 template and units part of the numbers 11-19 re (18) now used as (70).

(80) When, in cases as:

$$\boxed{\begin{matrix}3*3*3*1\\10\end{matrix}} \boxed{\begin{matrix}2\\2\end{matrix}} = 12 \text{ and}$$

$$\boxed{\begin{matrix}4*4*2\\10\end{matrix}} \boxed{\begin{matrix}4*2\\6\end{matrix}} = 16 \text{ and}$$

$$\boxed{\begin{matrix}6*4\\10\end{matrix}} \boxed{\begin{matrix}6*3\\9\end{matrix}} = 19,$$

is seen that the remainder of 10 added to other units is divisible.

(81) Can be understood that how many times the number occurs is the criterion and such examples expressed e.g. 12÷4=3 or 19÷6=3 rem. 1.

(82) With the numbers 20-29 re (24), in two stages as templates allow, it is obvious from substituted 10 values, that 2 can be divided straight into 20.

(83) Thus, 2 into 22 as 1 then and 1 unit, 2 into 24 as 1 ten and 2 units, and so on, introduces the idea of division according to place value.

(84) Into the highest figure first being logical re (80, 82).

(85) A variation of (80) is that 3 will divide into 21 etc. but not 2.

(86) Demonstrable is how remainders in the tens scale make other numbers e.g. 42÷3 leaves a 10 of the 40 to join 2 units.

(87) In such example the 30 is as (43, 45) re (77), which product—now of 2 figures—having been distinguished as (76).

(88) It is the subtraction of the product in this way e.g. 42-30 re (86), which is the underlying principle to the actual working of such in long division.

(89) Of fundamental application to hundreds, thousands, etc. are (83-88), and generally important is the point of (74) re (29, 30).

(90) Shown by the division of 10 into 20, 30, etc. is that this involves taking off the nought when the number has one—the opposite to (49). Similarly, re (69) the division of 100, 1000, etc.

(91) At the same time as (70, 79) is noticed the occurrence of factors i.e. 2 as most common re (73), 7 as infrequent.

(92) And that some numbers have several factors e.g. 2, 3, 4, 6, in 12.

(93) While others have only those of 1 and the number itself i.e. prime.

(94) Can be illustrated the splitting down of numbers (103) As, for example, 6 i.e. 2×3, in accordance with the remaining 2, 3, 5, of 12=2×2×3 and 18=2×3×3 and 30=2×3×5.

(104) Similarly to (100), where numbers include 2×2×2 or 2×2×3, these must also include 8 or 12.

(105) Such the case of 16=2×2×2×2 and 40=2×2×2 ×5 and 64=2×2×2×2×2×2.

(106) How, in these instances, the areas as (98) are 2×4 and 2×6 or 4×3 re (104)—also applicable to (101)—extends to combining the type of 2×2×3×3 as 4×9 or 6×6.

(107) And thus building up in reverse to (97).

(108) Since 2×2×2×2 re (105) and 2×3×3 re (103) so 2×2×2×2×2×3×3 composing a factor of 288.

(109) The selection of appropriate primes in (103, 105) and other demonstrated examples, impresses re (99) the principle whereby is determined the H.C.F.

(110) Especially since, at the same time, can be seen e.g. (103) that 2×2 or 3×3 or 3×5 are not in each number.

(111) This also relevant to how all the factors are required for the L.C.M.

(112) The fundamental idea of which is shown by the procedure of (101).

(113) Only now—a development from (92)—as different numbers are factors of the same number.

(114) Easily understandable from simple sets like 2, 3, 4, 6, which all fit into 12, 24, 36, 60, etc. is that this to be the lowest.

(115) That lowest being dependent on how some numbers fit into each other e.g. 2 into 4, the 3 into 6, both 2 and 3 into 6.

(116) As aspect becoming more complicated in such example as 2, 3, 4, 6, 9, 12. When 2 fits into 4, 6, 12 and 3 into 6, 9, 12. Both 2 and 6 into 12. Both 3 and 4 into 12. Etc.

(117) As such features are concerned in (100, 104), this illuminated by analysis into primes.

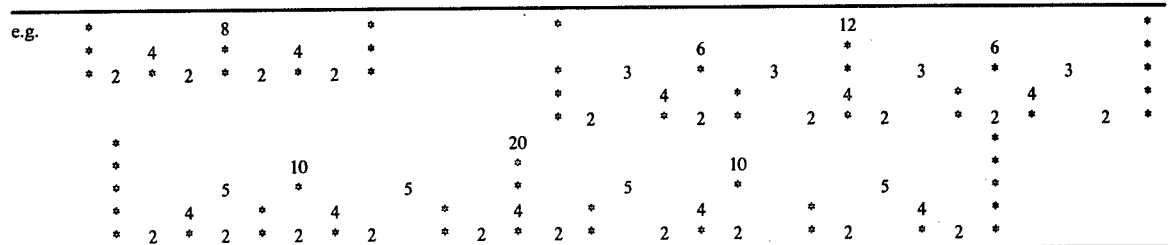

(95) Thus seen how factors may be common.

(96) And what is meant by the H.C.F. as the largest number which will divide into all of a group of numbers.

(97) Also clarified is the method of reducing to prime factors.

(98) Basic to the understanding of this, the analysis of (55). As, in the example of (94), the area of 8 is 2 lots of 2×2 i.e. 2×2×2, that of 12 is 2 lots of 2×3 i.e. 2×2×3, and that of 20 is 2 lots of 2×5 i.e. 2×2×5.

(99) The 4 which is the H.C.F. corresponding to how in each case is contained 2×2.

(100) Numbers which have both 2 and 2 or 2 and 3 or 3 and 3 etc. as prime factors, must also contain the respective multiples of 4, 6, 9, etc.

(101) This area being found to fit the exact number of times.

(102) Which is the other factor.

(118) Being seen in 2, 3, 2×2, 2×3, 3×3, 2×2×3 the correspondence with (116).

(119) Therefore, when duplication eliminated, and re (111) must be what required.

(120) In the same way, larger numbers fit into each other as, re (105), the 2×2×2×2 of 16 into the 2×2×2×2×2×2 of 64.

(121) Or partly so, e.g. 12 as 2×2×3 into 18 as 2×3×3.

(122) Thus, by (119) and considering (108) can be found the L.C.M. of any set of numbers.

(123) From the beginning, the use of the templates 1-10 has been instilling a concept of measurement in how these extend linear fashion.

(124) Contained in the relationships between these, the idea of a scale.

(125) As this involves units, are the squares of the base.

(126) Together, (123-125) have application to what is a quantity.

(127) Such concepts being fundamental to all forms of measurement in that these are analoguous to one another.

(128) The templates 1-100 foster recognition of dimensions.

(129) In a linear way as the sides.

(130) And, dependent on such,—area.

(131) Impressed is that this has a measurement in squares.

(132) Which shape distinguishable from an oblong.

(133) The conditioning to basic forms of measurement facilitates understanding of there being certain standards of this.

(134) Also, the metric system is composed of tens as the number scale.

(135) While square measure is in the same relationship of the unit square to the base.

(136) Are illustrated the terms length, breadth, perimeter.

(137) Area has been calculated during multiplication.

(138) Templates may be used to represent figures—especially when convenient to divide such as E, L, T shapes into rectangles, and in problems involving borders and wallpapering with allowances for fireplaces, etc.

(139) A triangle can be appreciated as half a rectangle which has corresponding sides.

(140) Monetary values are instilled where these, as the £1, are based on a unit composed of 100 subunits.

(141) Templates can be used for addition, subtraction, multiplication, division, in much the same way as for ordinary numbers.

(142) A fraction being what results from dividing a whole into any number of equal parts, all the templates are fractions of other templates or the base.

(143) By placing templates alongside, or the smaller on top—simultaneously:

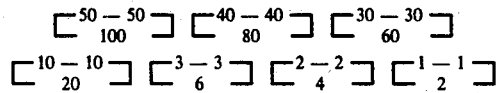

(144) In each case 2 equal parts make a whole.

(145) Conveying the idea of a fraction as a ratio in itself.

(146) From how the two parts vary as is the size of the whole.

(147) Whereby a fraction is also shown to be part of another quantity.

(148) These points (145-147), being impressed as, on the lines of (143), with suitable templates, is illustrated how 3, 4, 5, 6, 7, 8, 9, 10, equal parts make a whole. The base already of 100.

(149) The driven in what meant by the denominator.

(150) And the terms ½, ⅓, ¼, etc. as 1 of these parts.

(151) This corresponding to division by the number which is the denominator e.g. ½ of 80=40, 1/6 of 60=10.

(152) Dependent on there first being found 1 part.

(153) Is that can be shown 2 or more i.e. ⅔, 2/4, ¾, 2/5, 3/5, 4/5. Similarly, a complete range of 6ths-10ths. Together with examples of hundredths which include 4/100, 5/100, 10/100, 20/100, 25/100, 30/100, 40/100, 50/100, 60/100, 70/100, 75/100, 80/100, 90/100.

(154) The numerator thus significant as how many of the parts are under consideration.

(155) So recognised that where all of these e.g. 3/3 or 8/8 is a whole.

(156) In the same way as $1+1=2$, so $1/3+\frac{1}{3}=\frac{2}{3}$. And, as $9-5=4$, so $9/10-5/10=4/10$. Thereby seen that addition and subtraction effects no difference to the denominator.

(157) Manifest in a standard—60 being suitable to divide into 2, 3, 4, 5, 6, 10, 12, 15, 20,—is what might be noticed (143, 148) of how the more parts, the smaller these become.

(158) Can be understood that fractions have places on an inverse scale i.e. ½, ⅓, ¼, 1/5, etc.

(159) But also with this standard is shown that fractions increase from ½,—i.e. ⅔, ¾, 4/5, 5/6, ... 19/20, becoming respectively greater—towards a whole.

(160) And there are the comparative extremes of 1/100 and 99/100.

(161) Together, (157-160) provide a concept of fractions as:

0 ... 1/100 ... ¼ ... ½ ... ¾ ... 99/100 ... 1

(162) Repeating (143), attention is now paid to how these—except for the /-2-/, /-1-1-/,—are also 50/100, 40/80, 30/60, 10/20, 3/6, 2/4.

(163) Evident in each instance is that the same division into both the numerator and denominator—i.e. cancelling—would bring these to ½.

(164) Which can be understood as a fraction in its lowest terms.

(165) This, as the original value of such representations (143), being unchanged by the procedure of (163).

(166) And also unchanged—as constituting 50/100, 40/80, etc. in (162)—by the same multiplication of both numerator and denominator.

(167) Now recognisable to be the case re (155), which terms are all 1/1.

(168) Consolidating (163-166), similarly to (162) re (148, 153), are discovered the equivalences of other fractions.

(169) When is seen from how, for example ½=3/6 and ⅓=2/6, that fractions of initially differing denominators can be added or subtracted.

(170) What being required is a new denominator which is the L.C.M. of these denominators.

(171) To express fractions in the same terms being dependent on (166).

(172) Returning to (143) is demonstrated one and a half in each instance—as the general idea. Then, with the 20 templates, one and a half, two, two and a half, and with those of 6, 4, 2, what are one and a half, two, two and a half, three.

(173) Such being examples of mixed numbers.

(174) As, too, are one and two thirds, one and seven eighths, two and a fifth, two and five sixths, etc. re (148, 153) shown in similar fashion to (172).

(175) That wholes contain halves, thirds, quarters, etc. re (155) provides the rule of multiplying these by the denominator, then adding the fractional part to convert mixed numbers into fractions.

(176) These having the numerator larger than the denominator e.g. 5/2, 11/5, 17/6, being improper fractions—in contrast to what are called common.

(177) Is seen that, as the number of parts required to make a whole, the denominator of an improper fraction divided into the numerator gives the value as a mixed number.

(178) On which principle any number may be expressed as a fraction with a denominator of 1 e.g. 7=7/1.

(179) Can be appreciated that in adding or subtracting mixed numbers, it is simpler to deal with wholes and fractions separately as far as possible.

(180) The concept of (147) is intensified by the application of (151) to examples of ½, ⅓, ¼, etc. where the numbers are made up of other templates e.g. ½ of 12, ⅓ of 27, 1/7 of 35, etc.

(181) Then to instances where the fraction is not a single component e.g. ⅕ of 100 as 4 of 20 and 4 of 5, 1/6 of 90 as 6 of 10 and 6 of 5.

(182) A grasp of the idea extends to the not exactly divisible such as ½ of 41, ⅓ of 100, ¼ of 19, 1/5 of 62, when can be imagined the remaining squares are likewise divided so respectively twenty and a half, thirty three and a third, four and three quarters, ten and two fifths.

(183) This of relevance to the expression of remainders in ordinary division.

(184) And an aid to understanding that in (180–182) is determined the wholes, e.g. 6, of the certain size e.g. 2 parts, as indicated by the denominator.

(185) The templates now rearranged into 6 blocks of 2 etc. or, by substituting, 25 blocks of 4 etc.

(186) Instead of the 2 blocks of 6, etc. or 4 blocks of 25, etc.

(187) Which made 1 whole the size of 12, etc. or 100, etc.

(188) Of value here (184–187) being (145) re (143, 148).

(189) That whole now divided re (184) as (177). Thus 12/2, 27/3, etc. re (180), 100/4, 90/6, etc. (181).

(190) Replacing 12/1, 27/1, etc. 100/1, 90/1, etc.

(191) And cancelling to 6/1, 9/1, etc. 25/1, 15/1, etc.

(192) Also, alternatively to (187) and re (145), there are 12 wholes the size of 1 square and etc.

(193) Which can be visualised as divided across into 2 parts.

(194) As ½+½+½+½+½+½+½+½+½+½+½+½ these correspond to (47).

(195) And add re (156) to 12/2.

(196) So seen that 12 of ½ is equal to ½ of 12.

(197) In the same way as (41, 45, 46).

(198) Concerning a fraction "of" meaning multiplication.

(199) Such terms as ½×12/1 or ½×100/1 with the same entity as ordinary numbers.

(200) Whereby 12/2 or 100/4 re (189, 190).

(201) Constitutes multiplication of numerators and division by denominators.

(202) Gives the result of an entity which can be cancelled across the multiplication sign.

(203) In that similar demonstration re (180) of ⅔, 4/5, 7/8, etc. involves (152).

(204) Thus ⅔ twice ⅓ and 4/5 four times 1/5 and 7/8 seven times ⅛.

(205) Is emphasised (201). Consolidated (202).

(206) On the same lines, but not with a denominator of 1 in one instance, the multiplication of a fraction by another fraction.

(207) Which change of ratio—an aspect introduced in (184–187).

(208) Can be shown regarding e.g. ½×½, ½×⅓, ⅔×¾, ½×5/6, etc.

(209) By squares set out in blocks. Here, 24, as 6×4 being suitable.

(210) When on one side, ½ for example, is the length of 2 squares. On the other, ⅔ comprises the length of 4 squares.

(211) These a multiplied area of 8 squares which ⅓ that of the whole.

(212) The concept of (207) is also fundamental to division by a fraction.

(213) As 1/6 of 24 squares i.e. 4, fits into ½ i.e. 12.

(214) From such cases found the rule of inverting the divisor.

(215) Logical as this process is the opposite to multiplication.

(216) Can be realised that in both respects, mixed numbers must be changed into improper fractions.

(217) In that decimals are fractions with denominators of 10, 100, 1000, etc. all the templates have a decimal value.

(218) Taking the 10 template as a whole, the smaller are relative as 0.1, 0.2, 0.3, 0.4, 0.5, 0.6, 0.7, 0.8, 0.9.

(219) Which are the same figures as ordinary numbers but expressed with a point.

(220) And the same values as 1/10, 2/10, 3/10, etc.

(221) So recognisable that 0.5=½ and 0.2=1/5. The respective equivalents of 0.4, 0.6, 0.8 as 2/5, 3/5, 4/5.

(222) Can be shown 1.1, 1.2, 1.3, etc. That 2 ten templates (not 20), i.e. 2 wholes are required for 2.0, 2.1, 2.2, etc. then 3 tens for 3.0, etc. 4 tens for 4.0, etc. and so on, impresses the basic principle.

(223) Should be grasped the idea that decimals are a system combining the easier handled ordinary scale with tenths.

(224) Tenths being of ratio value, the base or 100 template can also stand as a whole.

(225) When 0.1 is the 10 template. This made up of 10 of 1.

(226) As 1/10 is equal to 10/100.

(227) Each 1 template being 1/100 of the whole.

(228) Expressed as 0.01.

(229) In accordance, (26, 29, 30).

(230) The 2 template as 0.02 i.e. 2/100, the 3 as 0.03 i.e. 3/100, and etc. continue from (227, 228) the second place of decimals.

(231) As tenths of the 20, 30, etc. which are now 0.2, 0.3, etc. re (225).

(232) And tenths of these as 20/100, 30/100, etc. re (226) and the whole.

(233) Which fractions cancel to 2/10, 3/10, etc. i.e. 0.2, 0.3, etc.

(234) But also, re (227–230) are 0.20, 0.30, etc. The figure in a ten times greater place to 0.02, 0.03.

(235) From how places are thus representative of fractions on a tens scale, is appreciated that a nought at the right end does not alter the value of a decimal.

(236) Also, that since, for example 10×2/10=2, i.e. 0.2 becomes 2., and 10×3/100=30/100 or 3/10, i.e. 0.03 becomes 0.3, to multiply by 10 the point is moved once to the right.

(237) On the same principle—as illustrated by 100×1/100=1, i.e. 0.01 becomes 1.,—to multiply by 100 the point is moved twice to the right.

(238) This seen from the templates to be the reverse of what was originally re (227, 228) division by 100. The point in 0.01 moved twice to the left from 1.

(239) Similarly, re (225, 228), division by 10 involves the point being moved once to the left.

(240) Is impressed the significance of the point.

(241) Can be realised that hundredths correspond to how there are hundreds on the ordinary scale as tenths balance tens.

(242) The decimals 0.25, 0.75 are seen to be $\frac{1}{4}$, $\frac{3}{4}$.

(243) From these and the values in (221) is discovered the rule of dividing the denominator into the numerator to convert a fraction into a decimal.

(244) Such the opposite to setting a decimal over a denominator, i.e. 10, 100 re (220, 230) to express this as a fraction.

(245) Shown by how division into 100 makes smaller parts to be taken into consideration—as in such examples as 0.22 and 0.37 compared to 0.2 and 0.4—is that using the second place of decimals is more accurate.

(246) Can be understood that in the same way as $1/10 = 10/100$ re (225, 226) so $1/100 = 10/1,000$ and thus a third place of decimals.

(247) Also consistent with (241) is that there be thousandths.

(248) Since the pattern of (246) must, by its nature, continue as $1/1,000 = 10/10,000$ and so on to place after place.

(249) Is gained a concept of decimals as an extension of the ordinary scale i.e. 100,000, 10,000, 1,000, 100, 10, 1, 1/10, 1/100, 1/1000, 1/10000, 1/100000—the terms in successive multiplication by ten from right to left.

(250) The position of the point, therefore, not altered by the addition or subtraction of decimals.

(251) Which can also be shown with the templates i.e. by substituting 70+30, 60+40, etc. for wholes.

(252) In that figures move into other places e.g. as $12.7896 + 3.4987 = 16.2883$ - whereas $12.7 + 3.4 = 16.1$—it is seen that the more places the greater the accuracy.

(253) Besides this being the case as the principle of (245) applies to ever smaller parts.

(254) As these are proportionately effected by multiplication or division, (252) is of special relevance.

(255) From (236-239) can be realised that, as a whole, such processes will make a difference to the point.

(256) What this is being understandable in how places have fractional values as re (225-228) $1/10 \times 1/10 = 1/100$. Which is $0.1 \times 0.1 = 0.01$.

(257) So, similarly, $0.12 \times 0.03 = 12/100 \times 3/100 = 3600/10000 = 0.0036$ and $0.61 \times 0.523 = 61/100 \times 523/1000 = 31903/100000 = 0.31903$ and $1.4 \times 0.7 = 14/10 \times 7/10 = 98/100 = 0.98$.

(258) Thus, too, the type of cases as are $0.014 \times 0.0006 = 14/1000 \times 6/10000 = 84/10000000 = 0.0000084$ and $7 \times 3.586 = 7 \times 3586/1000 = 25102/1000 = 25.102$.

(259) Such examples as have another fractional equivalent in one respect as $0.4 \times 0.35 = 2/5$ of 0.35, $0.25 \times 1.6 = \frac{1}{4}$ of 1.6, $0.75 \times 0.44 = \frac{3}{4}$ of 0.44, $0.05 \times 0.8 = 1/20$ of 0.8.

(260) Also demonstrable with the templates.

(261) Serve with those of (257, 258) to illustrate that multiplication is numerically the same as the ordinary scale.

(262) And that the position of the point corresponds to the total of the places in both numbers i.e. according to the multiplied denominator.

(263) Since this may reduce in the product e.g. $1.25 \times 0.24 = 125/100 \times 24/100 = 3000/10000 = 3/10 = 0.3$ and (259) re (260), can be appreciated how all the noughts of the multiplication are taken into account.

(264) The instilled fractional values are also relative to the method of division in that, for example, $0.546 \div 0.26 = 546/1000 \div 26/100$ and $1.71 \div 0.009 = 171/100 \div 9/1000$.

(265) With the divisors accordingly inverted so these $546/1000 \times 100/26$ and $171/100 \times 1000/9$, some noughts can be cancelled. Leaving $546/10 \times 1/26$ and $171 \times 10/9$.

(266) Which simplification to $54.6 \div 26$ and $1710 \div 9$ is recognisable as tantamount to moving the point of the divisor and applying the same multiplication to the dividend.

(267) From (245) and such examples as in (252) can be appreciated how are made approximations to a certain place.

(268) Is seen that currency re (140) can be expressed in decimal terms.

(269) The templates stand in the same relationship to the base as is referred to by the term percent. Every template thus has a percentage value.

(270) Which concepts will have been already absorbed though not in terms of what is meant by 1%, 16%, 44%, 73%, 98%, etc.

(271) And that these are fractions with a denominator of 100.

(272) But the whole is 100%.

(273) Since the templates have already been used for decimals is seen that $0.25 = 25\%$, $0.50 = 50\%$, $0.75 = 75\%$, $0.10 = 10\%$, $0.01 = 1\%$,—i.e. corresponding to these as hundredths.

(274) As such become wholes in percentage terms, other decimal values being converted by multiplying by 100.

(275) Reversely, a percentage changed into a decimal by dividing by 100.

(276) From the comprehensive dealing with fractions (153, 168) is recognised that $50\% = \frac{1}{2}$, $25\% = \frac{1}{4}$, $75\% = \frac{3}{4}$. Also the equivalents of 4%, 5%, 10%, 15%, 20%, 30%, etc. $12\frac{1}{2}\%$, $33\frac{1}{3}\%$, $66\frac{2}{3}\%$.

(277) Discoverable re counterparts in (273) is the same rule as (274) for converting a fraction.

(278) Is realised that where money has a hundred units as £100 or £1 i.e. 100p. percentages are the same figures.

(279) The templates can be used to represent cost price and selling price.

(280) Principal and interest.

(281) Stock and share values.

(282) The idea of ratio is illustrated by the templates 20-100 as these lie flat in their box. And stimulate a sorting into order of magnitude with the smaller on top.

(283) Ratio being a relationship of comparision on a fractional basis.

(284) In this case—including the 10 template in an arrangement as (282)—what expressed as 1:2:3:4:5:6:7:8:9:10.

(285) Any two or more of these may be ratios to each other e.g. 1:5 or 2:3:7:10.

(286) Which representations show irregular gradation.

(287) Different to the uniformity in the examples 3:6:9 and 4:8.

(288) Repeating that of (284).

(289) The characteristic seen to be that these are enlargements of parts of such range.

(290) With the same affinity of 1:2:3 and 1:2.

(291) Corrresponding to how there is a common factor in each number of 3:6:9 and 4:8.

(292) Thus, ratios can be reduced by division in the same way as fractions are cancelled.

(293) The basic idea is impressed and extended by placing the 1-10 templates to match the "steps" of 10-100 re (284).

(294) So now a reduced scale.

(295) In the contrast with (289), brought out the meaning of proportion as equality of ratios.

(296) Can be found which templates illustrate (294) for examples as (285).

(297) Then shown other ratios e.g. 2:7, 4:11, 3:8:12 etc. of varying sizes.

(298) Intrinsic in the dependence on suitable templates is that quantities are expressed in this way.

(299) Which must be of the same type for there to be a ratio.

(300) Two of these being as a quantity is a fraction of another e.g. 1:5 is 1/5.

(301) Three or more requiring, as indicated by the templates, a division according to the total of parts to be shared into certain ratios.

(302) Also involving ratio and proportion, unitary method is an application of fractions best shown according to the example.

(303) In the type where pipes fill baths, can be appreciated from individual representative areas e.g. 6 squares for A and 4 for B as minutes taken.

(304) That the L.C.M. is required as an area of a bath the right size for both fractions regarding 1 minute.

(305) As these added together make 5/12, the part of 1 square being 1/5 of the time.

(306) And thus the whole bath is $12 \times 1/5$.

(307) Similarly, but with subtraction, problems involving waste outlets.

(308) The idea of 1 re (304) is basic to all reasoning on these lines.

(309) Aided by using templates for, in one respect, the number of articles, in the other, the cost.

(310) With initial examples of exact division re (308) such as if 6 cost 48p.

(311) An aspect also relevant to work problems as seen that e.g. 3 men on a job for 15 days are doing a certain share.

(312) While 1 man would have all these shares.

(313) Needing the longer time which results from multiplication.

(314) By then illustrating this as 1 square and 45 squares.

(315) Is resolved how the load distributes among 5 men.

(316) What is an average can be demonstrated by taking from longer templates to add to shorter.

(317) Since thus made an area of the total items, division by the number giving the common standard.

(318) By the unit square and 1 template, base and 100 template, is provided re (132) a prototype for building up intermediate sizes of square.

(319) Which, previously encountered individually during multiplication.

(320) Now, as a group, impress the interdependent characteristics of a square and a number multiplied by itself.

(321) Thus seen what is meant by the term square, expressed as $2^2$, $3^2$, $4^2$, etc.

(322) And how the square root is a side of the square containing such number.

(323) With a 10 added to adjoining sides of the 100 template is made a side of 11.

(324) Which square has an incomplete corner where is needed the 1 template.

(325) The 121 thus composed of 100, two templates of 10, and 1.

(326) Are similarly constructed the squares of 12, 13, 14, 15, with respectively the 20, 30, 40, 50, templates. Then the squares of 16, 17, 18, 19,—substituting other templates to the values of 60, 70, 80, 90, for one extension.

(327) In each case, two.

(328) Ten times the units figure.

(329) Becoming progressively larger according to the sides.

(330) The incomplete corner being the square of the units figure.

(331) Emerges a pattern:

$$12^2 = 100 + 40 + 4 = 144 \quad 16^2 = 100 + 120 + 36 = 256$$
$$13^2 = 100 + 60 + 9 = 169 \quad 17^2 = 100 + 140 + 49 = 289$$
$$14^2 = 100 + 80 + 16 = 196 \quad 18^2 = 100 + 160 + 64 = 324$$
$$15^2 = 100 + 100 + 25 = 225 \quad 19^2 = 100 + 180 + 81 = 361$$

(332) Based on the original $10^2$, following (325).

(333) The square of 20, also according to (331, 332) as $100 + 200 + 100$.

(334) Brings a new dimension in that the corner to be filled is now a quarter of the total area.

(335) So the 21-29 squares, by substituting values, are built on this 400.

(336) Again, two side extensions.

(337) But twenty times the units figure.

(338) Likewise, (329, 330).

(339) Instead of (332), $20^2$.

(340) In:

$$21^2 = 400 + 40 + 1 = 441 \quad 26^2 = 400 + 240 + 36 = 676$$
$$22^2 = 400 + 80 + 4 = 484 \quad 27^2 = 400 + 280 + 49 = 729$$
$$23^2 = 400 + 120 + 9 = 529 \quad 28^2 = 400 + 320 + 64 = 784$$
$$24^2 = 400 + 160 + 16 = 576 \quad 29^2 = 400 + 360 + 81 = 841$$
$$25^2 = 400 + 200 + 25 = 625$$

(341) The nature of squares is seen further from how that of 30 brings the total area to 900.

(342) Which, increasing from 400 and 100 in the manner of the unit figure 9, 4, 1 squares.

(343) Conforming with (340) as $400 + 400 + 100$.

(344) Provides foundation for the 31-37 squares, as possible by substituting templates and the base.

(345) Such two side extensions.

(346) Thirty times the units figure.

(347) As previously, (329, 330).

(348) Now re (332, 339), $30^2$.

(349) Shown:

$31^2 = 900 + 60 + 1 = 961$
$32^2 = 900 + 120 + 4 = 1024$
$33^2 = 900 + 180 + 9 = 1089$
$34^2 = 900 + 240 + 16 = 1156$
$35^2 = 900 + 300 + 25 = 1225$
$36^2 = 900 + 360 + 36 = 1296$
$37^2 = 900 + 420 + 49 = 1369$ (350) Suggested by this and (331, 340), features as are (345-348), is that there could be a method of finding the square root.

(351) In that squares result from multiplication, the reverse as a type of division.

(352) Understandable from (318-322) is how the square of any digit 1-9 must be somewhere between 1 and 99.

(353) When, as $10^2$ is 100, there is a figure in the next place.

(354) Since the 1 of this begins another set re (352).

(355) The maximum of 9 in each i.e. 99, squaring to 9801.

(356) And, likewise to (353), $100^2$ is 10,000

(357) Digits being paired from the right.

(358) Whatever remains at the left, in a possible range of 1–99, as (352).

(359) Consistent with (342), the same pattern at both ends.

(360) Finding the square root—or this as of the nearest lower number re (358) in examples (331, 340, 349).

(361) Accounts for respectively 100, 400, 900 re (332, 339, 348).

(362) In each case leaves what corresponds with (327, 330).

(363) When the square re (360) is subtracted—in the manner of division.

(364) Dependent on this square as one of the sides is multiplied.

(365) The areas of the extensions.

(366) Being two, require a doubling of the figure re (360, 364).

(367) For a division in which the other factor is the side of the corner square.

(368) Thus, whatever squared.

(369) Is consistent with the final figure of the number and being placed re (329) as units to (366) re (327, 328, 337, 346).

(370) So that number formed multiplied by (368) gives what subtracts to zero i.e. dispersing the remaining area.

(371) Completes the solution.

(372) From factorisation is understandable how this can also be a method of finding the square root.

(373) A concept of what squared is important in algebra.

(374) If 10 is taken as x.

(375) 100 is $x^2$.

(376) So this and 1 square being $x^2 + 1^2$.

(377) With 11 as (323), $x+1$.

(378) Can be seen that $x+1$ times $x+1$ i.e. $(x+1)(x+1)$.

(379) Or $(x+1)^2$, equivalent to (325), is $x^2+2x+1$.

(380) Which, re (378) as each term in one bracket multiplied by each in the other.

(381) From how $(x+2)^2$, $(x+3)^2$, etc. re (326).

(382) Correlate with (327, 330), values (331).

(383) Is recognized that all expansions of this type—the same when x re (335–340) is 20, and re (344–349) is 30.

(384) Involve a middle term determined in a certain way.

(385) Between $x^2$ as (332) and the number square as (330)

(386) If, instead of x re (383), is retained the original 10.

(387) $20 = 2x$ and $400 = 4x^2$. While $30 = 3x$ and $900 = 9x^2$.

(388) So $(2x+1)^2$ etc. and $(3x+1)^2$ etc. similarly to (379) and re (335, 344).

(389) With counterparts as (340, 349).

(390) Illustrate the number aspect to the x.

(391) Provide examples which facilitate insight of the reverse factorisation.

(392) As y is given the value 1 in (377), 2, 3, etc. in (381).

(393) Shown re (376), $x^2 + y^2$.

(394) Side extensions that were previously the areas x times 1, x times 2, etc.

(395) Now, in the same way, x times y i.e. xy.

(396) Thus, re (377–379), likewise $(x+y)^2$ is $x^2 + 2xy + y^2$.

(397) And, re (388), are examples of $(2x+y)^2$ etc.

(398) Using the ideas of representation and multiplied areas so far outlined.

(399) Can be demonstrated other binomials e.g. $(x+2)(x+5)$ and $(2x+3)(2x+4)$. Also, e.g. $(x+6y)(x+8y)$ and $(2x+2y)(2x+7y)$.

(400) Only the extensions not symmetrical.

(401) Producing an oblong as the last term.

(402) In that re (374), $x-1$ is 9.

(403) $(x-1)(x-1) = 81$.

(404) Placing this on $x^2$ is seen the difference of 19.

(405) Comprises re (394), 2 areas x times 1 i.e. $2x = 20$.

(406) Except for one square where these overlap.

(407) So $x^2 - 2x$ is deducting 1 too many.

(408) And $x^2 - 2x + 1$ equals $(x-1)(x-1)$ re (403).

(409) Which, considering (380), shows two minus signs as multiplied are plus.

(410) Also, since re (404), $x^2 - (2x-1) = x^2 - 2x + 1$, is realised how a minus sign preceding changes those inside the bracket.

(411) Similar demonstration of $(x-2)^2$ etc. impresses that a square root can also be a negative.

(412) And sets the pattern for binomials of the same type.

(413) Which can also be illustrated with varied templates (414) Together with the mixed sign examples such as $(x+3)(x-2)$ and $(x+4y)(x-2y)$.

(415) Whereby appreciated that plus and minus are minus.

(416) The idea of scale suggests itself in the use of the templates as (138).

(417) This of application both regarding geometry.

(418) And graphs.

(419) In that the squares of the base are as graph paper is provided a background of introduction to the idea of such diagramatic representation.

(420) The templates can be used for graphs of the histogram type.

(421) Determining the position of a point on a surface according to axis being also basic to co-ordinate geometry.

(422) Of applications in algebra, the idea of ratio.

(423) Is fundamental to lines drawn inside a triangle parallel to one side.

(424) And to similar triangles—involved in trigonometry.

I claim:

1. A device for teaching concepts of numbers and mathematical principles comprising a base component having a surface visibly divided by lines into a hundred identical unit squares in ten by ten format, and a series of number elements having denominations 1,2,3,4,5,6,7,8,9,10,20,30,40,50,60,70,80 and 90, each of said number elements being dimensioned so that it is adapted to cover as many unit squares on said base component as is represented by that number element, each of said number elements being marked with the number it represents but being free of any line markings indicating the number it represents, and at least some of said number elements being sufficiently transparent to allow said marked unit squares on said base to be visible through said number element when said number elements are placed on said base component, whereby when one of said transparent number elements, other than the element representing the number 1, is on said base component, it is visibly divided into the number of unit squares equal to the number it represents, but when said one transparent element is off said base component, it is not so divided.

2. A device according to claim 1 wherein at least some of said number elements have dark sides whereby individual number elements can be distinguished when two or more such elements are placed on said base component in abutting relationship.

3. A device according to claim 1 wherein said base component and each of said number elements have means for holding said number elements on said base component.

4. A device according to claim 3 wherein each of said unit squares of said base component is provided with a peg and each number element is formed with a hole in each portion thereof which corresponds to a unit square, each of said holes being arranged to receive one of said pegs.

5. A device according to claim 1 wherein a quota of said number, elements is provided, said quota comprising ten of each of said number elements 1 to 10, five of said number elements 20, three of said number elements 30, two of said number elements 40 and 50, and one of said of said number elements 60, 70, 80, 90, 100.

6. A device according to claim 1, wherein each of said number elements representing the numbers 10,20,30,40,50,60,70,80 and 90 is ten unit squares long.

7. A device as claimed in claim 1, wherein each of said number elements is a flat template.

8. A device as claimed in claim 1, which includes at least one number element having a denomination of 100.

* * * * *